(12) United States Patent
Mourtada

(10) Patent No.: US 8,880,593 B2
(45) Date of Patent: Nov. 4, 2014

(54) TRANSIENT MARKET RESOURCE LOCATOR

(76) Inventor: Walid Mourtada, Denver, CO (US)

( * ) Notice: Subject to any disclaimer, the term of this patent is extended or adjusted under 35 U.S.C. 154(b) by 0 days.

(21) Appl. No.: 13/228,956

(22) Filed: Sep. 9, 2011

(65) Prior Publication Data

US 2013/0067079 A1    Mar. 14, 2013

(51) Int. Cl.
| | |
|---|---|
| *G06F 15/16* | (2006.01) |
| *G06Q 30/00* | (2012.01) |
| *G06F 15/173* | (2006.01) |
| *H04L 29/08* | (2006.01) |

(52) U.S. Cl.
CPC .............. *G06Q 30/00* (2013.01); *G06F 15/173* (2013.01); *H04L 67/22* (2013.01); *H04L 67/20* (2013.01)
USPC ............................ 709/203; 709/217; 709/223

(58) Field of Classification Search
CPC ......... H04L 67/20; H04L 67/22; G06F 15/16; G06F 15/173
USPC ........................... 709/203, 217, 219, 223, 224
See application file for complete search history.

(56) References Cited

U.S. PATENT DOCUMENTS

| | | | | |
|---|---|---|---|---|
| 6,060,993 | A * | 5/2000 | Cohen ........................ | 340/691.6 |
| 6,759,960 | B2 * | 7/2004 | Stewart ...................... | 340/573.1 |
| 7,163,145 | B2 * | 1/2007 | Cohagan et al. ............. | 235/380 |
| 7,594,605 | B2 * | 9/2009 | Aaron et al. ................. | 235/380 |
| 7,617,111 | B1 * | 11/2009 | Sheppard et al. ............. | 705/1.1 |
| 7,698,228 | B2 * | 4/2010 | Gailey et al. .................. | 705/64 |
| 7,860,519 | B2 * | 12/2010 | Portman et al. ............ | 455/456.3 |
| 7,877,267 | B2 * | 1/2011 | Sheppard et al. ............. | 705/1.1 |
| 7,895,335 | B2 * | 2/2011 | Watson, Jr. .................. | 709/227 |
| 8,412,231 | B1 * | 4/2013 | White et al. ............... | 455/456.1 |
| 2007/0100728 | A1 * | 5/2007 | Rotman et al. ............. | 705/36 R |
| 2008/0072064 | A1 * | 3/2008 | Franchi ........................ | 713/186 |
| 2008/0229225 | A1 * | 9/2008 | Kaye ............................ | 715/771 |
| 2010/0082374 | A1 * | 4/2010 | Charania et al. ................. | 705/5 |
| 2011/0060808 | A1 * | 3/2011 | Martin et al. ................ | 709/217 |
| 2012/0290339 | A1 * | 11/2012 | Sussman et al. ................. | 705/5 |
| 2013/0019202 | A1 * | 1/2013 | Regan et al. ................. | 715/810 |
| 2013/0024219 | A1 * | 1/2013 | Martinez .......................... | 705/5 |
| 2013/0346543 | A1 * | 12/2013 | Benantar et al. ............. | 709/217 |

* cited by examiner

*Primary Examiner* — Lashonda Jacobs

(57) ABSTRACT

Technologies and implementations for locating transient transaction resources are generally disclosed.

30 Claims, 9 Drawing Sheets

700 A computer program product.

702 A signal bearing medium.

704 Machine-readable instructions stored thereon, which, if executed by one or more processors, operatively enable a computing device to:
    receive an indication to locate a transaction resource;
    responsive to the received indication, transmit a request to locate the transaction resource to a transaction resource facilitator; and
    receive a proximate geographic location of the transaction resource, the received proximate geographic location information of the transaction resource based, at least in part, on a geographic location of an origination of the request and a predetermined time span corresponding to the transaction resource.

| 706 a computer-readable medium. | 708 a recordable medium. | 710 a communications medium. |

Fig. 7

800 A computer program product.

802 A signal bearing medium.

804 Machine-readable instructions stored thereon, which, if executed by one or more processors, operatively enable a computing device to:
  receive a request to locate a transaction resource, the request including geographic location information of an origination of the request;
  determine if the geographic location information is within a predetermined geographic location based, at least in part, on the transaction resource;
  if it is determined that the geographic location information is within the predetermined geographic area, determine if the received request is within a predetermined time span based, at least in part, on the transaction resource; and
  if it is determined that the received request is within the predetermined time span, transmit a proximate geographic location information of the transaction resource to the origination of the request.

| 806 a computer-readable medium. | 808 a recordable medium. | 810 a communications medium. |

Fig. 8

TRANSIENT MARKET RESOURCE LOCATOR

BACKGROUND

Unless otherwise indicated herein, the approaches described in this section are not prior art to the claims in this application and are not admitted to be prior art by inclusion in this section.

Various events, functions, gatherings, etc. commonly may be associated with a limited period of time and place. For example, a sporting event may be held on a particular day and at a particular venue. Retail stores may have sales and/or events held on a particular day and at a particular location. Accordingly, finding transaction resources such as, but not limited to, a particular vendor at a sporting or a transaction resource such as, but not limited to, a particular potential buyer at a swap meet can be difficult.

SUMMARY

The present disclosure describes example methods, apparatus, and systems related to locating transient transaction resources. Such an apparatus may include a user interface, module, a global positioning system (GPS) module, a transmitter module, a receiver module, a display device, a processor, and a signal bearing medium. The processor may be communicatively coupled to the user interface, the GPS module, the transmitter module, the receiver module, and the display device. The signal bearing medium may comprise machine-readable instructions stored thereon, which, if executed by the processor, may operatively enable a computing device to receive an indication to locate a transaction resource, responsive to the received indication, may transmit a request to locate the transaction resource to a transaction resource facilitator, and may receive a proximate geographic location information of the transaction resource. The received proximate location information of the transaction resource based, at least in part, on a geographic location of an origination of the request and a predetermined time span corresponding to the transaction resource.

Another example apparatus may include a receiver module, a transmitter module, a processor, and a signal bearing medium. The processor may be communicatively coupled to the receiver module and the transmitter module. The signal bearing medium may comprise machine-readable instruction stored thereon, which, if executed by the processor, operatively enable a computing device to receive a request to locate a transaction resource, the request may include geographic location information of an origination of the request. A determination may be made as to whether geographic area information is within a predetermined geographic location based, at least in part, on the transaction resource. If it is determined that the geographic location information is within the predetermined geographic area, a determination may be made if the received request is within a predetermined time span based, at least in part, on the transaction resource. If it is determined that the received request is within the predetermined time span, a proximate geographic location information of the transaction resource may be transmitted to the origination of the request.

In an example method, the method may include receiving an indication to locate a transaction resource. Responsive to the received indication, a request to locate the transaction resource may be transmitted to a transaction resource facilitator. The method may also include receiving a proximate geographic location information of the transaction resource. The received proximate location information of the transaction resource may be based, at least in part, on a geographic location of an origination of the request implementing the method and a predetermined time span corresponding to the transaction resource.

In yet another example method, the method may include receiving a request to locate a transaction resource, the request including geographic location information of an origination of the request. It may be determined whether geographic location information is within a predetermined geographic area based, at least in part, on the transaction resource. If it is determined that the geographic location information is within the predetermined geographic area, another determination may be made as to whether the received request is within a predetermined time span based, at least in part, on the transaction resource. If it is determined that the received request is within the predetermined time span, transmitting a proximate geographic location information of the transaction resource to the origination of the request.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

In the drawings:

FIG. 7 illustrates an example computer program product that is arranged in accordance with at least some examples of the present disclosure;

FIG. 8 illustrates an example computer program product that is arranged in accordance with at least some examples of the present disclosure.

DETAILED DESCRIPTION

Figure 1:
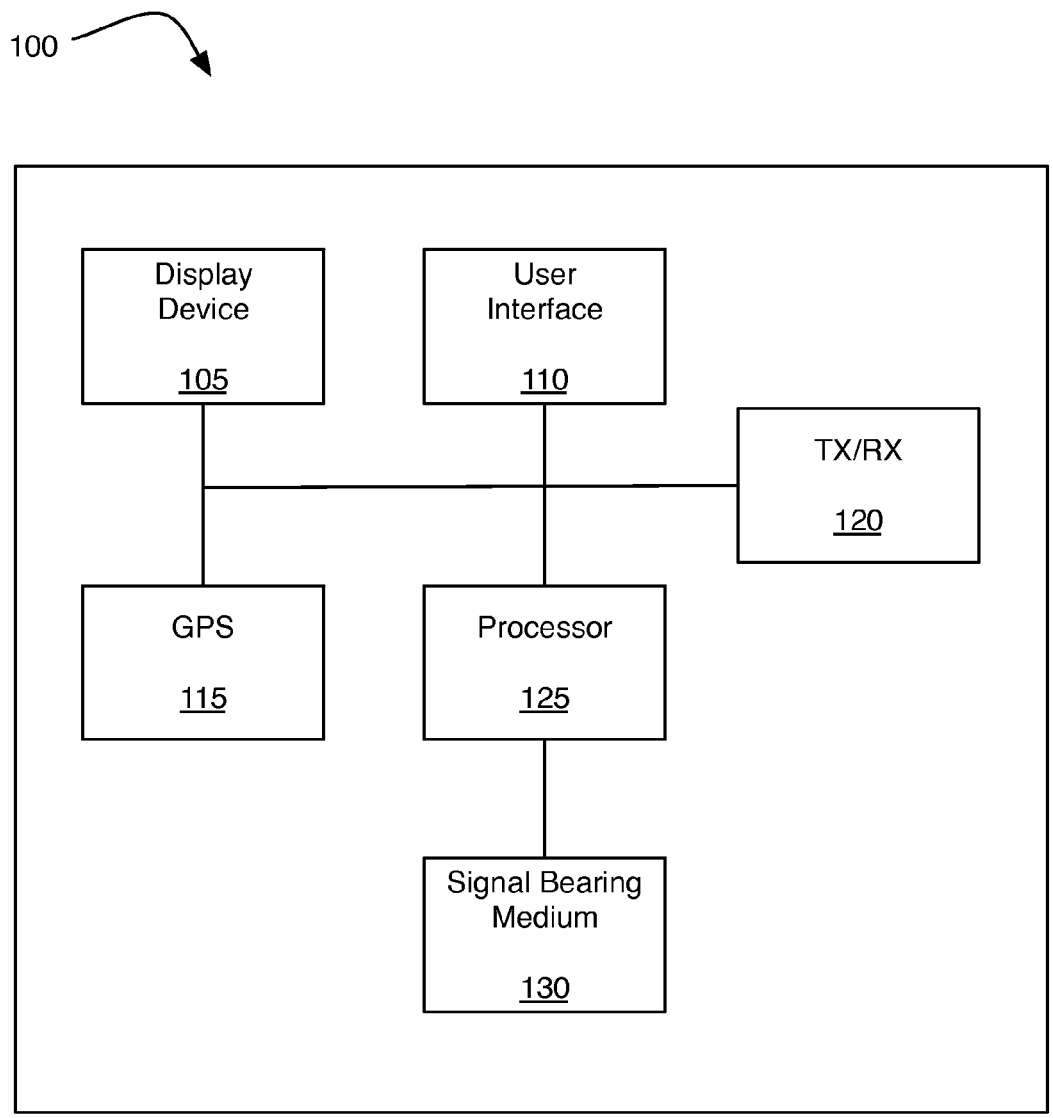
FIG. 1 illustrates an example apparatus that is arranged in accordance with at least some embodiments of the present disclosure.

The following description sets forth various examples along with specific details to provide a thorough understanding of claimed subject matter. It will be understood by those skilled in the art, however, that claimed subject matter may be practiced without some or more of the specific details disclosed herein. Further, in some circumstances, well-known methods, procedures, systems, components and/or circuits have not been described in detail in order to avoid unnecessarily obscuring claimed subject matter.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, apparatus, and systems related locating transient transaction resources.

As discussed above locating transient transaction resources may include utilizing a transaction resource facilitator, and receiving a proximate geographic location information of the transaction resource. If relational data is included, a more accurate geographic location information of the transaction resource may be utilized including detailed information of the transaction resource.

FIG. 1 illustrates an example apparatus that is arranged in accordance with at least some embodiments of the present disclosure. In the illustrated example, apparatus 100 may include a display device 105, a user interface module 110, a global positioning system (GPS) module 115, and a transmit and receive (TX/RX) module 120. Additionally, apparatus 100 may include a processor 125 and a signal bearing medium 130. As illustrated in FIG. 1, processor 125 may be communicatively coupled to user interface module 110, GPS module 115, TX/RX module 120, and display device 105. In the illustrated example of FIG. 1, processor 125 may be communicatively coupled to signal bearing medium 130 as well. As will be described in more detail, components illustrated in the one example of FIG. 1 may work together to facilitate signal bearing medium 130 to include stored machine-readable instructions, which when executed by processor 125, may operatively enable apparatus 100 to receive an indication to locate a transaction resource. Responsive to the received indication, the executed instructions may enable apparatus 100 to transmit, via TX/RX module 120, a request to locate the transaction resource to a transaction resource facilitator. Further, apparatus 100 may receive, via TX/RX 120, a proximate geographic location information of the transaction resource, where the received proximate location information of the transaction resource may be based, at least in part, on a geographic location of an origination of the request and a predetermined time span corresponding to the transaction resource.

As will be described in detail, in illustrated example of FIG. 1, received proximate location information of the transaction resource may be graphically displayed on display device 105. Additionally, indication to locate the transaction resource may be received via user interface 110. Further, apparatus 100 may be enabled to transmit the request to locate the transaction resource along with geographic location information via TX/RX module 120.

In various embodiments, relational data corresponding to the transaction resource locator may be transmitted, and in-turn, a more accurate geographic location information of the transaction resource along with detailed information of the transaction resource itself may be received by apparatus 100 and may be graphically displayed on display device 105. Relational data may include data such as, but not limited to, a login with password, restricted monetary equivalent information (gift card type), credit card information, advertizing revenue, or the like. That is, a wide variety of financial transactions may be utilized involving transaction resource locator and requestor. The financial transaction may facilitate a more accurate geographic location of the transaction resource including more detail as to type of transaction resource.

In the embodiment illustrated in FIG. 1, apparatus 100 may be included in a wide variety of computing devices such, as but not limited to, a mobile device, a client device, a computing device included in a vehicle, and so forth, and accordingly, is not limited in these respects. For the purposes of describing the disclosed subject matter, apparatus 100 may be included in a mobile device, such as, but not limited to a smart type mobile phone. Continuing with the example of a smart type mobile phone, apparatus 100 may include display device 105 such as, but not limited to, a touchscreen type display device. Along these lines, user interface module 110 may be a wide variety of interface modules such as, but not limited to, graphical user interface including operating systems facilitating graphical user interaction with apparatus 100. GPS module 115 may include a wide variety of GPSs included in computing devices such as, but not limited to, GPS modules included in smart type mobile phones.

Processor 125 may include a wide variety of processors such as, but limited to, a computer, a microprocessor, a microcontroller, a field programmable gate array (FPGA), an application specific integrated circuit (ASIC), a sequestered thread or a core of a multi-core/multi-threaded microprocessor or a combination thereof.

For simplicity of describing the disclosed subject matter, TX/RX 120 may be illustrated as a unified module. However, it should be appreciated that TX/RX module 120 may be implemented as a wide variety of transmit and receive modules, which may be in included a wide variety of computing devices, such as, but not limited to, TX/RX module or separate TX and RX modules implemented to facilitate utilization of wide variety of transmit and/or receive operations. Transmit and/or receive operations may include a wide variety of operations such as, but not limited to, wired, wireless, infrared (IR), etc. transmit and/or receive operations.

As will be described in further detail, signal bearing medium 130 may encompass a wide variety of signal bearing mediums such as, but not limited to, a recordable medium such as, but not limited to, memory, read/write (R/W) CDs, R/W DVDs, etc., and accordingly, it not limited in these respects.

Illustrated example of FIG. 1 facilitates locating transient transaction resources in accordance with various embodiments of the present disclosure.

Figure 2:
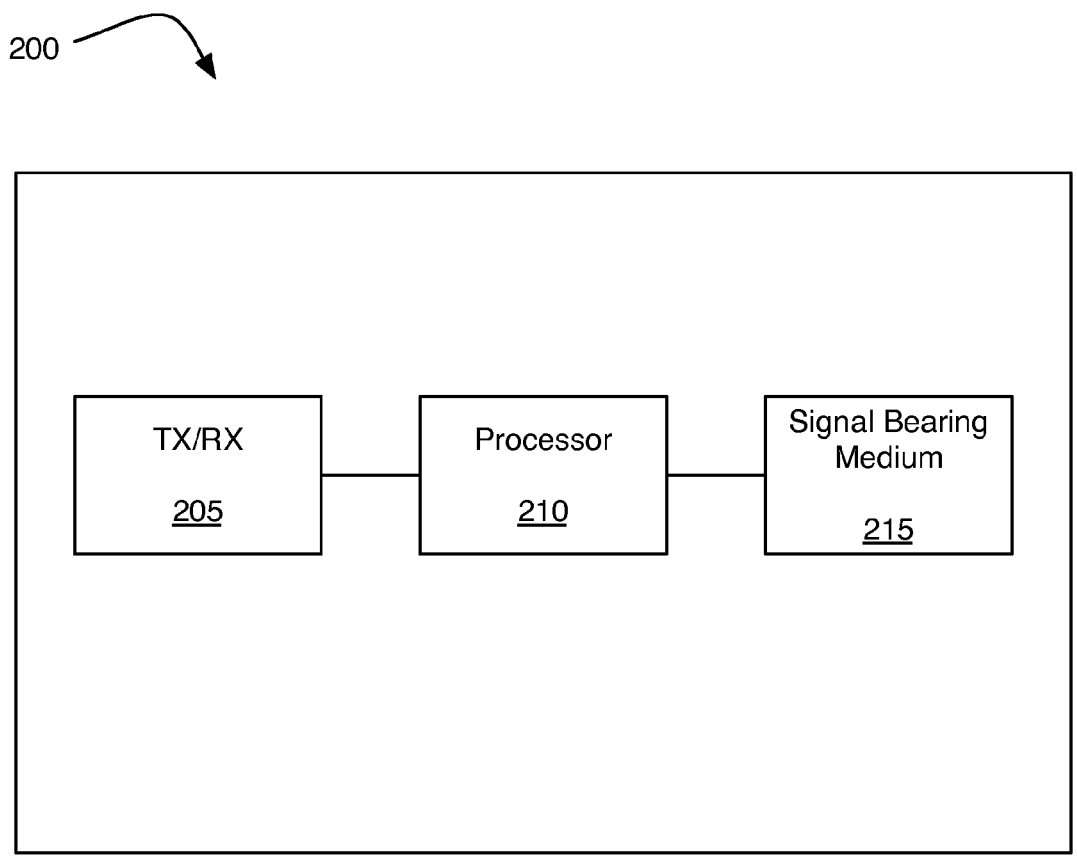
FIG. 2 illustrates an example apparatus that is arranged in accordance with at least some embodiments of the present disclosure.

FIG. 2 illustrates an example apparatus that is arranged in accordance with at least some embodiments of the present disclosure. In the illustrated example, apparatus 200 may include a transmit and receive (TX/RX) module 205. Additionally, apparatus 200 may include a processor 210 and a signal bearing medium 215. As illustrated in FIG. 2, processor 210 may be communicatively coupled to TX/RX module 205 and signal bearing medium 215. As will be described in more detail, together, components illustrated in the one example of FIG. 2 may work together to facilitate signal bearing medium 215 to include stored machine-readable instructions, which when executed by processor 210, may operatively enable apparatus 200 to receive, via TX/RX module 205, a request to locate a transaction resource, the request including geographic location information of an origination of the request. A determination may be made if the geographic location information is within a predetermined geographic area based, at least in part, on the transaction resource. If it is determined that the geographic location information is within the predetermined geographic area, a determination may be made whether the received request is within a predetermined time span based, at least in part, on the transaction resource. If it is determined that the received request is within the predetermined time span, a proximate geographic location information of the transaction resource may be transmitted, via TX/RX module 205, to the origination of the request.

Additionally, in accordance with various embodiments, apparatus may determine if relational data is received. If it is determined that relational data is received, apparatus 200 may transmit, via TX/RX 205, a more accurate geographic location information of the transaction resource along with detailed information of the transaction resource. As previously alluded to, relational data may include data such as, but not limited to, a login with password, restricted monetary equivalent information (gift type card), credit card information, advertizing revenue, or the like. That is, a wide variety of financial transactions may be utilized involving requestor and transaction resource. The financial transaction may facilitate providing a more accurate geographic location information of the transaction resource including more detail as to type of transaction resource.

In the embodiment illustrated in FIG. 2, apparatus 200 may be included in a wide variety of computing devices such as, but not limited to, a mobile device, a client device, a computing device included in a vehicle, a server type device, or any combination thereof, such as, but not limited to, ubiquitous computing device (e.g., cloud computing), and so forth, and accordingly, is not limited in these respects. For the purposes of describing the disclosed subject matter, apparatus 200 may be included in a server type device.

In FIG. 2, here again, for simplicity of describing the disclosed subject matter, TX/RX 205 may be illustrated as a unified module. However, it should be appreciated that TX/RX module 205 may be implemented as a wide variety of transmit and receive modules, which may be in included a wide variety of computing devices, such as, but not limited to, TX/RX module or separate TX and RX modules implemented to facilitate utilization of wide variety of transmit and/or receive operations. Transmit and/or receive operations may include a wide variety of operations such as, but not limited to, wired, wireless, infrared (IR), etc. transmit and/or receive operations.

Processor 210 may include a wide variety of processors such as, but limited to, a computer, a microprocessor, a microcontroller, a field programmable gate array (FPGA), an application specific integrated circuit (ASIC), a sequestered thread or a core of a multi-core/multi-threaded microprocessor or a combination thereof.

Here as well, as will be described in further detail, signal bearing medium 215 may encompass a wide variety of signal bearing mediums such as, but not limited to, a recordable medium such as, but not limited to, memory, read/write (R/W) CDs, R/W DVDs, etc., and accordingly, it not limited in these respects.

It should be appreciated by those skilled in the art, that in order to not obscure the disclosed subject matter and to facilitate understanding of the disclosed subject matter, apparatus 100 and 200 (shown in FIGS. 1 and 2) and their respective components are illustrated as functional blocks. That is, it is contemplated that apparatus 100 and 200 may be implemented in a wide variety of manners within the scope of the claimed subject matter without detracting the disclosed subject matter, and accordingly, the disclosed subject matter is not limited with these respects.

Figure 3:
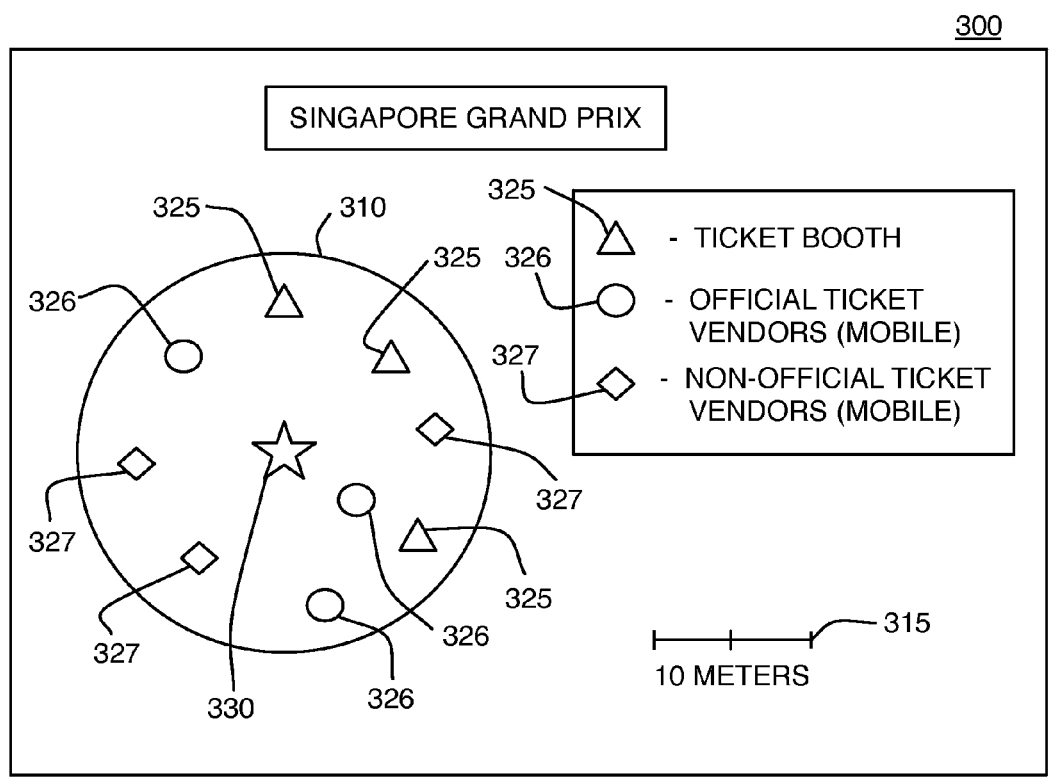
FIG. 3 illustrates an example of locating transient transaction resources in accordance with various embodiments of the disclosed subject matter.

FIG. 3 illustrates an example of locating transient transaction resources in accordance with various embodiments of the disclosed subject matter. In FIG. 3, an example of a graphically generated display 300 is shown. As previously described, graphically generated display 300 may be a result of interaction with apparatus 100 (shown in FIG. 1) with apparatus 200 (shown in FIG. 2) from the point of view of apparatus 100. For the illustrated example, it may be assumed that apparatus 100 may be included in a computing device such as, but not limited to, a smart type mobile phone. As previously described, apparatus 100 may have received an indication to locate a transaction resource, via a user interface such as, but not limited to, a graphical user interface included in the display device 105 (shown in FIG. 1). Graphical user interface may also include various user interface engines such as, but not limited to various applications, which may also be referred to as "Apps". In this one example, the transaction resource may be for a ticket vendor to facilitate purchasing a ticket for admission to an event such as, but not limited to, Singapore Grand Prix, and in particular, the qualifying run (assuming Singapore Grand Prix may be held Friday, September $23^{rd}$-Sunday, September $26^{th}$, with qualifying runs held on Saturday, September $25^{th}$). Responsive to receiving the indication to locate a qualifying run ticket and/or vendor for the Singapore Grand Prix, mobile phone may transmit a request to locate the ticket vendor to a transaction resource facilitator. For this example, transaction resource facilitator may be an apparatus such as, but not limited to, a server type computing device hosted remotely. Accordingly, continuing with the example illustrated in FIG. 3, an apparatus such as the apparatus 200 (shown in FIG. 2) may be a server type computing device having various data associated with the Singapore Grand Prix, such as, but not limited to, dates of the events, various vendors for various goods and/or services including tickets, schedule of events, maps, etc.

Continuing to refer to FIG. 3, and in particular, the example of the transaction resource of ticket vendor, mobile phone may receive a proximate geographic location information of various ticket vendors offering qualifying run tickets, the received proximate location information of the ticket vendors may be based, at least in part, on a geographic location information of the mobile phone and a predetermined time span corresponding to the transaction resource (e.g., Friday, September $25^{th}$ to 8:00 p.m. of Saturday, September $25^{th}$). That is, before qualifying run, where dates and times in the example may be local time (i.e., Singapore time). Continuing with the example of the Singapore Grand Prix, geographic location information of mobile phone may be that of being within Singapore, and in more particular, Marina Bay area of Singapore, which may be the area of the race course. Accordingly, geographic location information of mobile phone may be considered to be within a predetermined geographic area (e.g., within Singapore and/or Marina Bay area). Additionally, the request may be transmitted by the mobile phone on Saturday morning some time (i.e., the request may be determined to be within the predetermined time span).

In accordance with various embodiments, had the geographic location information of the mobile phone been outside the predetermined area (e.g., not within Singapore and/or Marina Bay area), a proximate geographic location information may include an error message to facilitate indication that the mobile phone is outside the geographic area for the transaction. Additionally, had the mobile phone transmitted the request outside the predetermined time span (e.g., 8:30 p.m. on Saturday, September 25$^{th}$), a proximate location information may include an error message to facilitate indication that the mobile ticket vendor is unavailable because qualifying run has already begun.

Continuing to refer to FIG. 3 in light of the example above, graphically generated display 300 may include a title of the event (Singapore Grand Prix) 305, a graphical representation of a proximity map 310, a scale 315, a legend 320, various transaction resources 325-327, and geographic location information of mobile phone 330. In the example of FIG. 3, proximity map 310 may indicate proximate geographic location information of various ticket vendors 325-327. As illustrated, location of ticket vendors 325-327 may be displayed as proximate geographic locations relative to geographic location of mobile phone 330. Additionally, detail provided may include stationary ticket vendors (e.g., ticket booth), mobile ticket vendors (e.g., official ticket vendors), and individual ticket vendors (e.g., mobile and/or stationary non-official ticket vendors). Further, in the example illustrated in FIG. 3, scale 315 may be provided to at least indicate relative distances to the various ticket vendors 325-327. However, vendors 326-327 may continually move within, move into, and move out of the proximity map 310. That is, graphically generated display 300 may continually change based, at least in part, on the movement of the vendors 325-327 (i.e., refresh).

As previously described, information to graphically generate graphically generated display 300 having proximate location of ticket vendors 325-327 may have been received from server, the server having transmitted proximate geographic location information of ticket vendors 325-327 to mobile phone after receiving the request and making various determinations. For the purposes of describing the disclosed subject matter, it may be assumed that mobile phone did not receive error messages as previously described.

In various embodiments, proximate geographic location information may include more or less detail than the example embodiment illustrated in FIG. 3. For one example, received proximate geographic location information may include information to facilitate generation of a graphical representation of a table listing various transaction resources and their relative distances without including information as to relative positions (i.e., without proximity map 310). In yet another example, received proximate geographic location information may include information to facilitate generation of a text-based display (i.e., a display communicatively coupled to the mobile device may be less sophisticated or received proximate geographic location information may be at reduced data).

Figure 4:
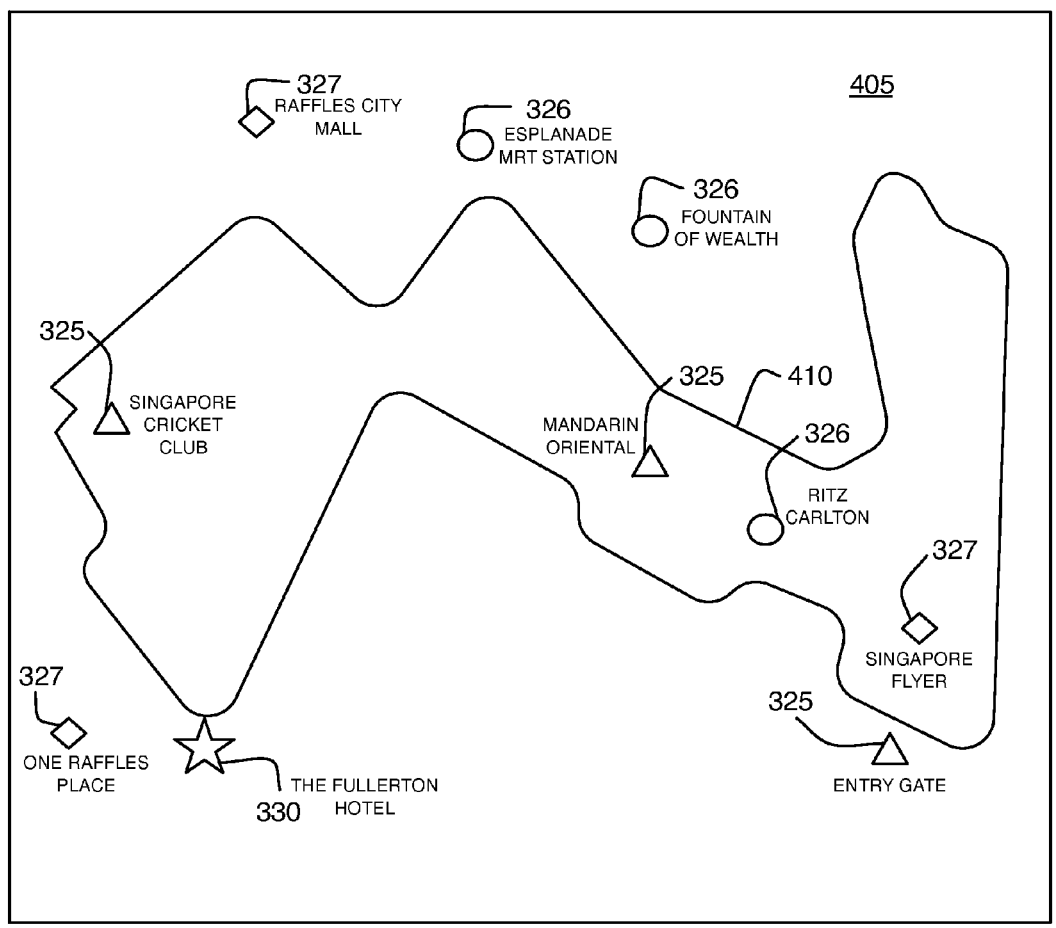
FIG. 4 illustrates a further example of locating transient transaction resources in accordance with various embodiments of the disclosed subject matter.

FIG. 4 illustrates a further example of locating transient transaction resources in accordance with various embodiments of the disclosed subject matter. Continuing with the example described with respect to FIG. 3, in the example embodiment of FIG. 4, mobile phone may have received, via user interface, relational data corresponding to transaction resource locator (e.g., server), and transmitted the relational data to the server. In response, mobile phone may have received a more accurate geographic location information of the transaction resource (e.g., ticket vendors) along with detailed information of the transaction resource (e.g., ticket vendors' goods and/or services). As shown in FIG. 4, having transmitted relational data and receiving the more accurate geographic location information, mobile phone may graphically generate display 400 based, at least in part, on the data received with more accurate geographic location information along with detailed information.

In FIG. 4, graphically generated display 400 may include a detailed map 405, for this one example, including race course 410. Additionally, detailed map 405 may include various ticket vendors 325-327 (shown in FIG. 3) similar to FIG. 3. However, as illustrated in FIG. 4, geographic location information of ticket vendors 325-327 may be more accurate including geographic location of mobile phone. For example, ticket vendors 325-327 information may include building location including location relative to race course 410 on detailed map 405. Additionally, in accordance with various embodiments of the disclosed subject matter, graphically generated display 400 may include a graphical user interface such as, but not limited to, a graphical representation of a pointer, where if a pointer is detected near the vicinity of one or more to the transaction resources (e.g., ticket vendors 325-327), mobile phone may generate a pop-up type menu to provide further details such as, but not limited to, name of vendor, hours of operation, pricing information, contact information, etc.

The illustrated example of FIG. 4 may be in response to mobile phone transmitting and server receiving relational data, as previously described. That is, a financial type transaction may have occurred to facilitate locating a transaction resource. It should be appreciated by those skilled in the art that the transaction resource may be a consumer, a vendor, and any combination thereof, and accordingly, the claimed subject matter is not limited in this respect.

As alluded to, transaction resources 325-327 and mobile phone (e.g., apparatus 100) may have a transactional relationship with transaction resource facilitator 200. That is, ticket vendors 325-327 may have registered with server providing various information such as, but not limited to, type of tickets, official status, etc. Additionally, as one skilled in the art may appreciate, transaction resources may also include various geographic location information modules such as, but not limited to, GPS modules to provide geographic location information about themselves to transaction resource facilitator.

It should be appreciated by those skilled in the art that graphically generated displays 300 and 400 of FIGS. 3 and 4 are for illustrative purposes only, and a wide variety of displays may be generated to facilitate interaction as described in the disclosed subject matter, and accordingly, the claims subject matter is not limited in this respect.

Additionally, it should be appreciated that even though the example described may have been with respect to an event such as an auto race, it is contemplated within the scope of the claimed subject matter that the claimed subject matter may be applicable to a wide variety of examples such as, but not limited to, sporting events, trade shows, conferences, etc., and accordingly, it not limited in these respects. In the examples illustrated in FIGS. 3 and 4, a request to locate a transaction resource may be received from a "consumer" (e.g., buyer of tickets), and correspondingly, transaction resource may include a "seller" (e.g., vendor of tickets). However, it is contemplated within the scope of the claimed subject matter transaction resource may include either consumer or seller (i.e., receiver/searcher or provider of resources), and accordingly, the claimed subject matter is not limited in these respects. For example, referring back to FIGS. 3 and 4 and continuing with the example of the Singapore Grand Prix, at a seller's machine, (stationary ticket vendor and/or mobile ticket vendor) machine may receive an indication to locate a transaction resource (potential buyer) and transmit a request to locate the potential buyer to a transaction resource facilitator (server, with which both potential buyer and seller may have previously registered with as previously described). The seller may receive a proximate geographic location information of the potential buyer, the received proximate geographic location information of the transaction resource may be based, at least in part, on a geographic location information of an origination of the request and a predetermined time span corresponding to the transaction resource. As alluded to, the example may equally be applicable to examples, where transaction resources may be of a like kind. That is, buyer looking for buyer and/or seller looking for seller, and accordingly, claimed subject matter is not limited with these respects.

Referring back to FIGS. 3 and 4, predetermined time span may include a variety of time spans. In the example of the Singapore Grand Prix, predetermined time span may also include a predetermined time span starting before the start of the event and ending at the end of the event. Accordingly, the claimed subject matter is not limited in these respects.

Figure 5:
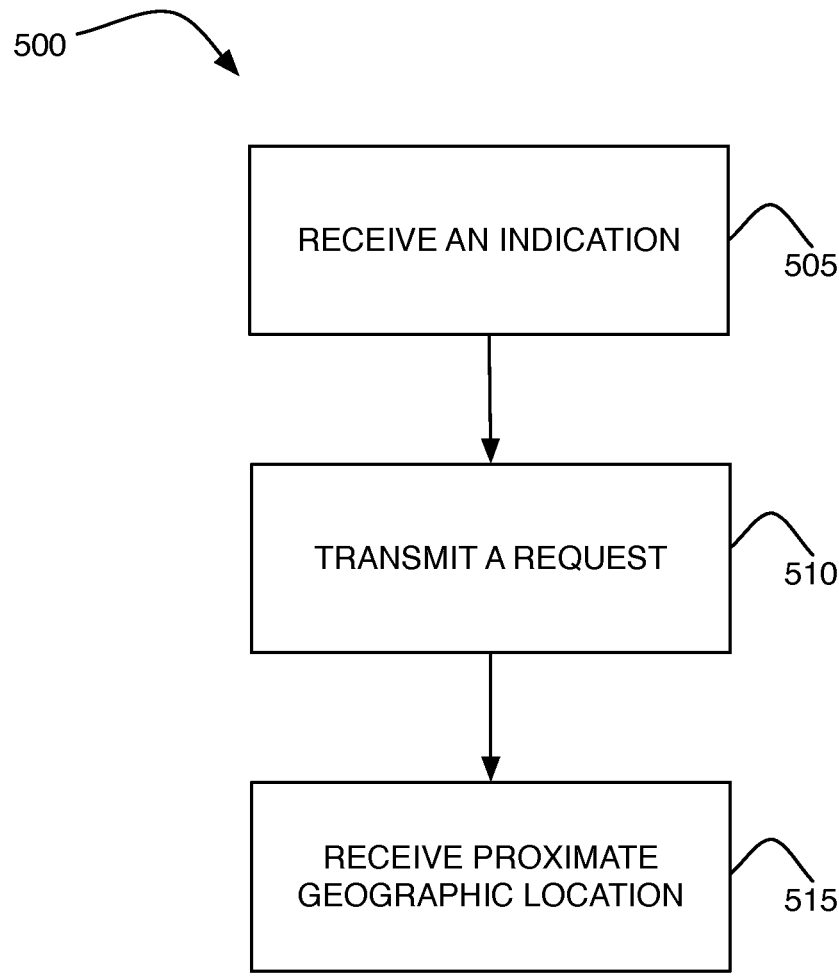
FIG. 5 illustrates another example process for locating transient transaction resources in accordance with at least some embodiments of the present disclosure.

FIG. 5 illustrates another example process for locating transient transaction resources in accordance with at least some embodiments of the present disclosure. In the illustrated example, process 500 may include one or more of functional operations as indicated by example operations 505, 510, and/or 515.

As illustrated, process 500 may be implemented for locating transient transaction resources. Processing may begin at operation 505, "RECEIVE AN INDICATION", where an indication to locate a transaction resource may be received. For example, the indication may be received via a user interface.

Processing may continue from operation 505 to operation 510, "TRANSMIT A REQUEST", where responsive to the received indication, a request to locate the transaction resource is transmitted to a transaction resource facilitator.

Processing may continue from operation 510 to operation 515, "RECEIVE PROXIMATE GEOGRAPHICAL LOCATION", where a proximate geographic location information of the transaction resource may be received. The received proximate location information of the transaction resource may be based, at least in part, on a geographic location information of an origination of the request and a predetermined time span corresponding to the transaction resource.

Figure 6:
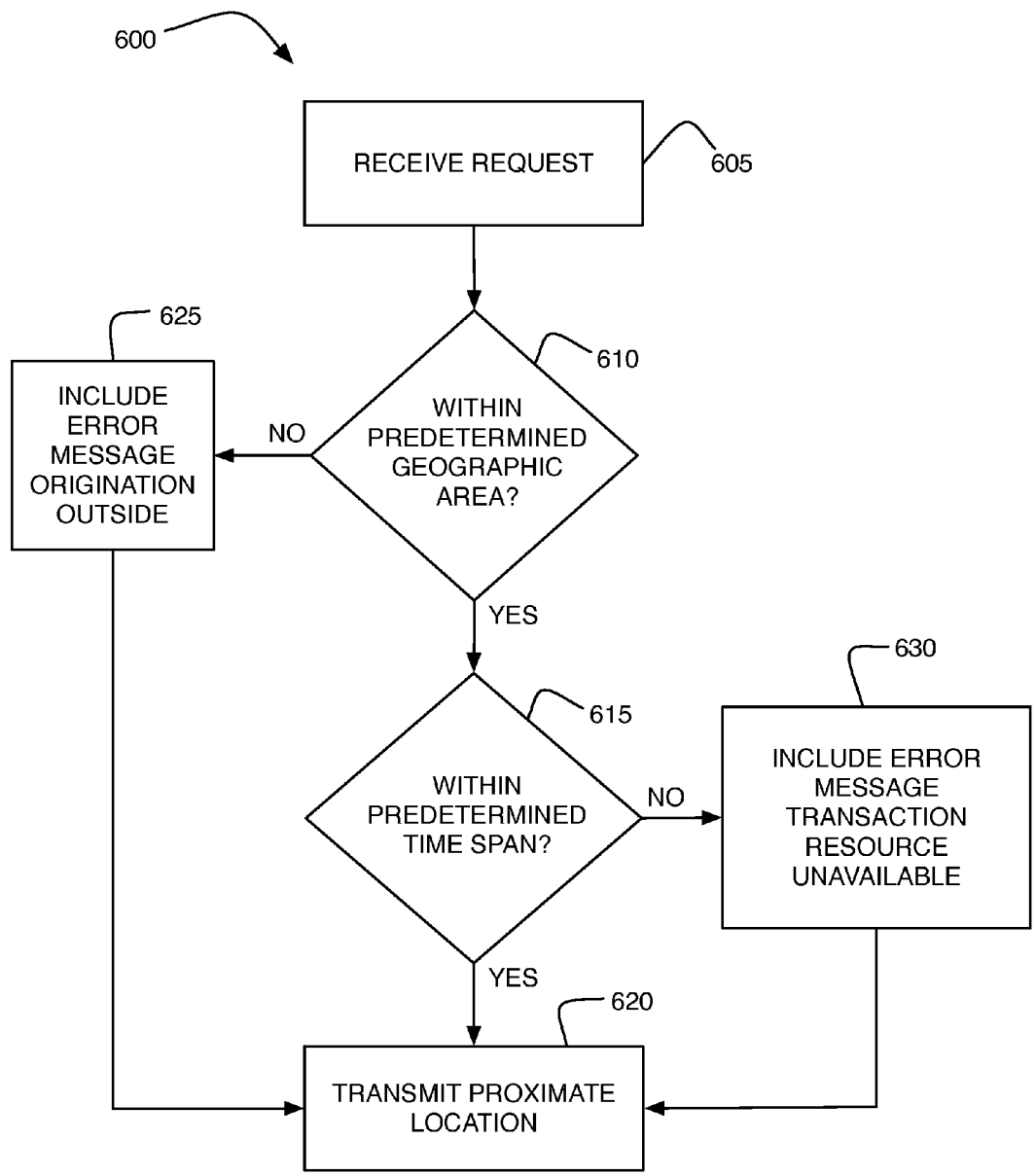
FIG. 6 illustrates another example process for locating transient transaction resources in accordance with at least some embodiments of the present disclosure.

FIG. 6 illustrates another example process for locating transient transaction resources in accordance with at least some embodiments of the present disclosure. In the illustrated example, process 600 may include one or more of functional operations as indicated by example operations 605, 610, 615, 620, 625, and/or 630.

As illustrated, process 600 may be implemented for locating transient transaction resources. Processing may begin at operation 605, "RECEIVE A REQUEST", where a request to locate a transaction resource may be received. The request may include geographic location information of an origination of the request.

Processing may continue from process 605 to process 610, "WITHIN PREDETERMINED GEOGRAPHIC AREA?", where a determination may be made as to whether the geographic location information is within a predetermined geographic area based, at least in part, on the transaction resource.

If it is determined that the geographic location information is within the predetermined geographic area, processing may continue from process 610 to process 615, "WITHIN PREDETERMINED TIME SPAN", where a determination may be made as to whether the received request is within a predetermined time span based, at least in part, on the transaction resource.

If it is determined that the received request is within the predetermined time span, processing may continue from process 615 to 620, "TRANSMIT PROXIMATE LOCATION", where a proximate geographic location information of the transaction resource may be transmitted to the origination of the request.

Back at process 610, if it is determined that the received geographic location information is not within the predetermined geographic area, process may continue from process 610 to process 625, "INCLUDE ERROR MESSAGE ORIGINATION OUTSIDE", where a proximate geographic location information having an error message may be transmitted to facilitate indication that the geographic location of an origination of the request is outside the predetermined geographic location based, at least in part, on the transaction resource.

Back at process 615, if it is determined that the received request is not within the predetermined time span, processing may continue from process 615 to process 630, "INCLUDE ERROR MESSAGE TRANSACTION RESOURCE UNAVAILABLE", where a proximate geographic location information having an error message may be transmitted to facilitate indication that the transaction resource is unavailable based, at least in part, on the transaction resource.

FIG. 7 illustrates an example computer program product 700 that is arranged in accordance with at least some examples of the present disclosure. Program product 700 may include a signal bearing medium 702. Signal bearing medium 702 may include one or more machine-readable instructions 704, which, if executed by one or more processors, may operatively enable a computing device to provide the functionality described above with respect to FIG. 5. Thus, for example, apparatus 100 (see, e.g., FIG. 1) may undertake one or more of the actions shown in FIG. 5 in response to instructions 704 conveyed by medium 702.

In some implementations, signal bearing medium 702 may encompass a non-transitory computer-readable medium 706, such as, but not limited to, a hard disk drive, a Compact Disc (CD), a Digital Versatile Disk (DVD), a digital tape, memory, etc. In some implementations, signal bearing medium 702 may encompass a recordable medium 708, such as, but not limited to, memory, read/write (R/W) CDs, R/W DVDs, etc. In some implementations, signal bearing medium 702 may encompass communications medium 710, such as, but not limited to, a digital and/or an analog communication medium (e.g., a fiber optic cable, a waveguide, a wired communications link, a wireless communication link, etc.).

FIG. 8 illustrates an example computer program product 800 that is arranged in accordance with at least some examples of the present disclosure. Program product 800 may include a signal bearing medium 802. Signal bearing medium 802 may include one or more machine-readable instructions 804, which, if executed by one or more processors, may operatively enable a computing device to provide the functionality described above with respect to FIG. 6. Thus, for example, apparatus 200 (see, e.g., FIG. 2) may undertake one or more of the actions shown in FIG. 6 in response to instructions 804 conveyed by medium 802.

In some implementations, signal bearing medium 802 may encompass a non-transitory computer-readable medium 806, such as, but not limited to, a hard disk drive, a Compact Disc (CD), a Digital Versatile Disk (DVD), a digital tape, memory, etc. In some implementations, signal bearing medium 802 may encompass a recordable medium 808, such as, but not limited to, memory, read/write (R/W) CDs, R/W DVDs, etc. In some implementations, signal bearing medium 802 may encompass communications medium 810, such as, but not limited to, a digital and/or an analog communication medium (e.g., a fiber optic cable, a waveguide, a wired communications link, a wireless communication link, etc.).

Figure 9:
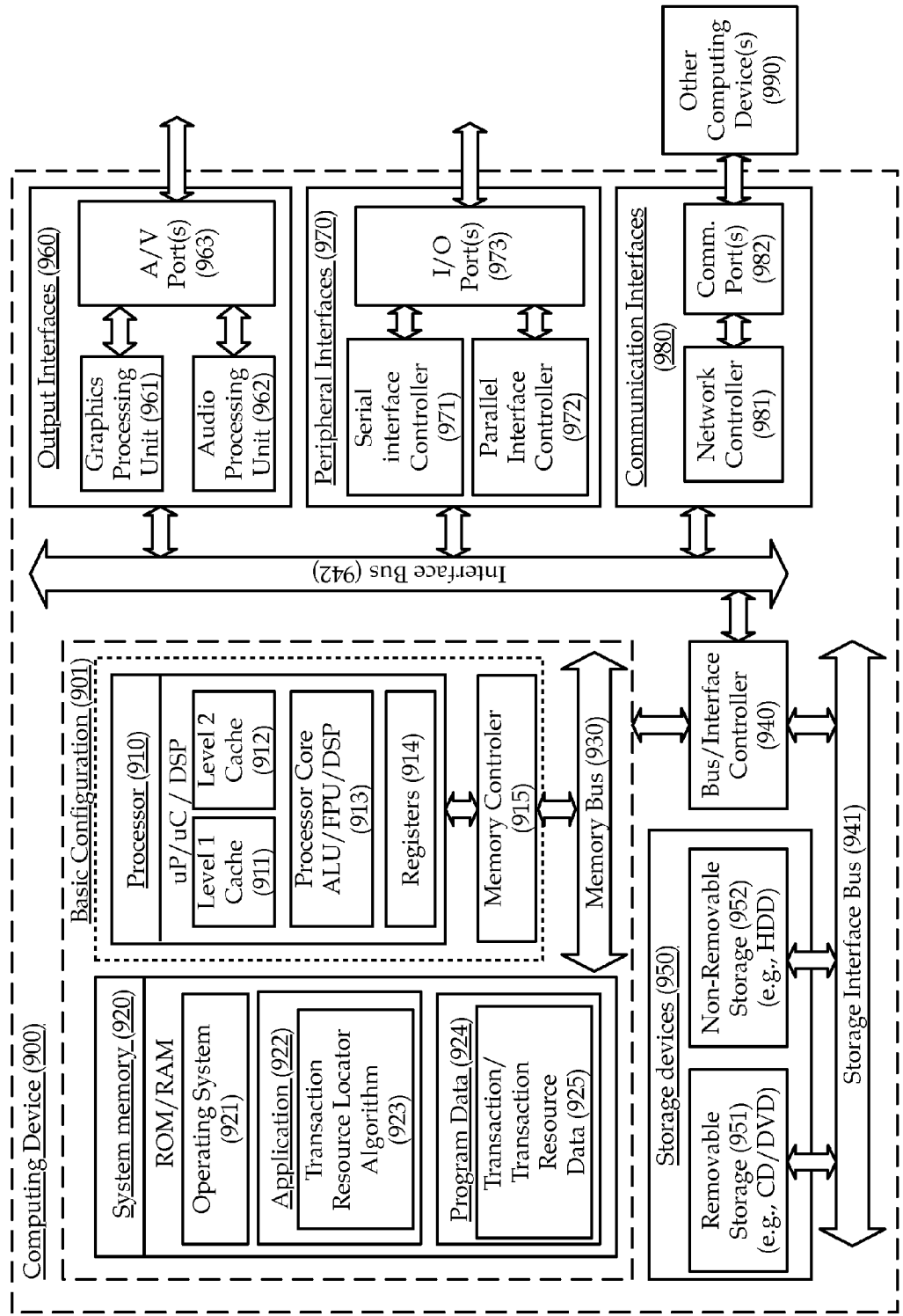
FIG. 9 is a block diagram illustrating an example computing device, such as might be embodied by a person skilled in the art, which is arranged in accordance with at least some embodiments of the present disclosure.

FIG. 9 is a block diagram illustrating an example computing device 900, such as might be embodied by a person skilled in the art, which is arranged in accordance with at least some embodiments of the present disclosure. In one example configuration 901, computing device 900 may include one or more processors 910 and system memory 920. A memory bus 930 may be used for communicating between the processor 910 and the system memory 920.

Depending on the desired configuration, processor 910 may be of any type including but not limited to a microprocessor (µP), a microcontroller (µC), a digital signal processor (DSP), or any combination thereof. Processor 910 may include one or more levels of caching, such as a level one cache 911 and a level two cache 912, a processor core 913, and registers 914. The processor core 913 may include an arithmetic logic unit (ALU), a floating point unit (FPU), a digital signal processing core (DSP Core), or any combination thereof. A memory controller 915 may also be used with the processor 910, or in some implementations the memory controller 915 may be an internal part of the processor 910.

Depending on the desired configuration, the system memory 920 may be of any type including but not limited to volatile memory (such as RAM), non-volatile memory (such as ROM, flash memory, etc.) or any combination thereof. System memory 920 may include an operating system 921, one or more applications 922, and program data 924. Application 922 may include an transaction resource locator algorithm 923 that is arranged to perform the functions as described herein including the functional blocks and/or actions described with respect to process 500 of FIG. 5 and/or process 600 of FIG. 6. Program Data 924 may include transaction resource data 925 for use with transaction resource locator algorithm 923. In some example embodiments, application 922 may be arranged to operate with program data 924 on an operating system 921 such that implementations of locating transaction resources may be provided as described herein. For example, apparatus 100 (see, e.g., FIG. 1) and/or apparatus 200 (see, e.g., FIG. 2) may comprise all or a portion of computing device 900 and be capable of performing all or a portion of application 922 such that implementations of locating transaction resources may be provided as described herein. This described basic configuration is illustrated in FIG. 9 by those components within dashed line 901.

Computing device 900 may have additional features or functionality, and additional interfaces to facilitate communications between the basic configuration 901 and any required devices and interfaces. For example, a bus/interface controller 940 may be used to facilitate communications between the basic configuration 901 and one or more data storage devices 950 via a storage interface bus 941. The data storage devices 950 may be removable storage devices 951, non-removable storage devices 952, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 920, removable storage 951 and non-removable storage 952 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 900. Any such computer storage media may be part of device 900.

Computing device 900 may also include an interface bus 942 for facilitating communication from various interface devices (e.g., output interfaces, peripheral interfaces, and communication interfaces) to the basic configuration 901 via the bus/interface controller 940. Example output interfaces 960 may include a graphics processing unit 961 and an audio processing unit 962, which may be configured to communicate to various external devices such as a display or speakers via one or more NV ports 963. Example peripheral interfaces 960 may include a serial interface controller 971 or a parallel interface controller 972, which may be configured to communicate with external devices such as input devices (e.g., keyboard, mouse, pen, voice input device, touch input device, etc.) or other peripheral devices (e.g., printer, scanner, etc.) via one or more I/O ports 973. An example communication interface 980 includes a network controller 981, which may be arranged to facilitate communications with one or more other computing devices 990 over a network communication via one or more communication ports 982. A communication connection is one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR) and other wireless media. The term computer readable media as used herein may include both storage media and communication media.

Computing device 900 may be implemented as a portion of a small-form factor portable (or mobile) electronic device such as a cell phone, a personal data assistant (PDA), a personal media player device, a wireless web-watch device, a personal headset device, an application specific device, or a hybrid device that includes any of the above functions. Computing device 900 may also be implemented as a personal computer including both laptop computer and non-laptop computer configurations. In addition, computing device 900 may be implemented as part of a wireless base station or other wireless system or device.

Some portions of the foregoing detailed description are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing device, that manipulates or transforms data represented as physical electronic or magnetic quantities within memories, registers, or other information storage devices, transmission devices, or display devices of the computing device.

Claimed subject matter is not limited in scope to the particular implementations described herein. For example, some implementations may be in hardware, such as employed to operate on a device or combination of devices, for example, whereas other implementations may be in software and/or firmware. Likewise, although claimed subject matter is not limited in scope in this respect, some implementations may include one or more articles, such as a signal bearing medium, a storage medium and/or storage media. This storage media, such as CD-ROMs, computer disks, flash memory, or the like, for example, may have instructions stored thereon, that, when executed by a computing device, such as a computing system, computing platform, or other system, for example, may result in execution of a processor in accordance with claimed subject matter, such as one of the implementations previously described, for example. As one possibility, a computing device may include one or more processing units or processors, one or more input/output devices, such as a display, a keyboard and/or a mouse, and one or more memories, such as static random access memory, dynamic random access memory, flash memory, and/or a hard drive.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a flexible disk, a hard disk drive (HDD), a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Reference in the specification to "an implementation," "one implementation," "some implementations," or "other implementations" may mean that a particular feature, structure, or characteristic described in connection with one or more implementations may be included in at least some implementations, but not necessarily in all implementations. The various appearances of "an implementation," "one implementation," or "some implementations" in the preceding description are not necessarily all referring to the same implementations.

While certain exemplary techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

What is claimed:

1. A method comprising:
   receiving, at a computing device, an indication to locate a transient transaction resource;
   responsive to the received indication, transmitting, from the computing device, a request to locate the transient transaction resource to a transaction resource facilitator; and
   receiving, at the computing device, a proximate geographic location information of the transient transaction resource, the received proximate geographic location information of the transient transaction resource based, at least in part, on a geographic location information of an origination of the request and a predetermined time span corresponding to the transient transaction resource, wherein an availability of the transient transaction resource is based, at least in part, on the geographic location information of the origination of the request and/or the predetermined time span.

2. The method of claim 1 further comprising displaying the received proximate geographic location information of the transient transaction resource on a display device.

3. The method of claim 1, wherein receiving the indication comprises receiving an indication via a user interface.

4. The method of claim 1, wherein transmitting the request comprises transmitting a request to locate the transient transaction resource along with geographic location information of the origination of the request.

5. The method of claim 4, wherein transmitting the request to locate the transient transaction resource along with geographic location information comprises transmitting global positioning system (GPS) information of the origination of the request.

6. The method of claim 1 further comprising:
   receiving relational data corresponding to the transient transaction resource;
   transmitting the relational data to the transient transaction resource facilitator; and receiving a more accurate geographic location information of the transient transaction resource along with detailed information of the transient transaction resource.

7. The method of claim 6, wherein the relational data comprises at least one of a login with password, restricted monetary equivalent information, or credit card information.

8. The method of claim 1, wherein receiving the proximate geographic location information comprises receiving a proximate geographic location information having an error message to facilitate indication that a geographic location of the origination of the request is outside of a predetermined geographic area.

9. The method of claim 8, wherein the predetermined geographic area comprises a geographic area based, at least in part, on the transient transaction resource.

10. The method of claim 8, wherein receiving the proximate geographic location information comprises receiving a proximate geographic location information having an error message to facilitate indication that the transient transaction resource is unavailable during a predetermined time span.

11. A method comprising:
receiving a request to locate a transient transaction resource, the request including geographic location information of an origination of the request;
determining if the geographic location information is within a predetermined geographic location based, at least in part, on the transient transaction resource;
if it is determined that the geographic location information is within the predetermined geographic area, determining if the received request is within a predetermined time span based, at least in part, on the transient transaction resource; and
if it is determined that the received request is within the predetermined time span, transmitting a proximate geographic location information of the transient transaction resource to the origination of the request, wherein an availability of the transient transaction resource is based, at least in part, on the geographic location information of the origination of the request and/or the predetermined time span.

12. The method of claim 11 further comprising:
determining if relational data corresponding to the origination of the request is received; and
if it is determined that relational data is received, transmitting a more accurate geographic location information of the transient transaction resource along with detailed information of the transient transaction resource.

13. The method of claim 12, wherein the relational data comprises at least one of a login with password, restricted monetary equivalent information, or credit card information.

14. The method of claim 11 further comprising:
if it is determined that the received geographic location information is not within the predetermined geographic area, transmitting a proximate geographic location information having an error message to facilitate indication that the geographic location of the origination of the request is outside the predetermined geographic location based, at least in part, on the transient transaction resource.

15. The method of claim 11 further comprising:
if it is determined that the received request is not within the predetermined time span, transmitting a proximate geographic location information having an error message to facilitate indication that the transient transaction resource is unavailable based, at least in part, on the transient transaction resource.

16. An apparatus comprising:
a user interface module;
a global positioning system (GPS) module;
a transmitter module;
a receiver module;
a display device;
a processor communicatively coupled to the user interface module, the GPS module, the transmitter module, the receiver module, and the display device; and
a non-transitory machine readable medium having stored therein a plurality of instructions, which, if executed by the processor, operatively enable a computing device to receive an indication to locate a transient transaction resource, responsive to the received indication, transmit a request to locate the transient transaction resource to a transaction resource facilitator, and receive a proximate geographic location of the transient transaction resource, the received proximate geographic location information of the transient transaction resource based, at least in part, on a geographic location of an origination of the request and a predetermined time span corresponding to the transaction resource, wherein an availability of the transient transaction resource is based, at least in part, on the geographic location information of the origination of the request and/or the predetermined time span.

17. The apparatus of claim 16, wherein the plurality of instructions, which, if executed by the processor, operatively enable a computing device to display the received proximate geographic location information of the transient transaction resource on a display device.

18. The apparatus of claim 16, wherein the plurality of instructions, which, if executed by the processor, operatively enable a computing device to receive the indication via the user interface.

19. The apparatus of claim 16, wherein the plurality instructions, which, if executed by the processor, operatively enable a computing device to transmit a request to locate the transient transaction resource along with geographic location information of the apparatus.

20. The apparatus of claim 19, wherein the plurality of instructions, which, if executed by the processor, operatively enable a computing device to transmit global positioning system (GPS) information of an origination of the request.

21. The apparatus of claim 16, wherein the plurality of instructions, which, if executed by the processor, operatively enable a computing device to receive relational data corresponding to the transient transaction resource, transmit the relational data to the transaction resource facilitator, and receive a more accurate geographic location information of the transient transaction resource along with detailed information of the transient transaction resource.

22. The apparatus of claim 21, wherein the plurality of instructions, which, if executed by the processor, operatively enable a computing device to transmit relational data comprising at least one of a login with password, restricted monetary equivalent information, or credit card information.

23. The apparatus of claim 16, wherein the plurality of instructions, which, if executed by the processor, operatively enable a computing device to receive a proximate geographic location information having an error message to facilitate indication that a geographic location of the apparatus is outside of a predetermined geographic area.

24. The mobile device of claim 23, wherein the plurality of instructions, which, if executed by the processor, operatively enable a computing device to receive a predetermined geographic area comprising a geographic area based, at least in part, on the transient transaction resource.

25. The mobile device of claim 23, wherein the plurality of instructions, which, if executed by the processor, operatively enable a computing device to receive a proximate geographic location information comprising a proximate geographic location information having an error message to facilitate indication that the transaction resource is unavailable during a predetermined time span.

26. An apparatus comprising:
  a receiver module;
  a transmitter module;
  a processor communicatively coupled to the receiver module and the transmitter module; and
  a non-transitory machine readable medium having stored therein a plurality of instructions, which, if executed by the processor, operatively enable a computing device to receive a request to locate a transient transaction resource, the request including geographic location information of an origination of the request, determine if the geographic location information is within a predetermined geographic location based, at least in part, on the transient transaction resource, if it is determined that the geographic location information is within the predetermined geographic area, determine if the received request is within a predetermined time span based, at least in part, on the transient transaction resource, and if it is determined that the received request is within the predetermined time span, transmit a proximate geographic location information of the transient transaction resource to the origination of the request, wherein an availability of the transient transaction resource is based, at least in part, on the geographic location information of the origination of the request and/or the predetermined time span.

27. The apparatus of claim 26, wherein the plurality of instructions, which, if executed by the processor, operatively enable a computing device to determine if relational data corresponding to the apparatus is received, and if it is determined that relational data is received, transmit a more accurate geographic location information of the transient transaction resource along with detailed information of the transient transaction resource.

28. The apparatus of claim 27, wherein the plurality of instructions, which, if executed by the processor, operatively enable a computing device to determine if relational data comprising at least one of a login with password, restricted monetary equivalent information, or credit card information is received.

29. The apparatus of claim 26, wherein the plurality of instructions, which, if executed by the processor, operatively enable a computing device to, if it is determined that the received geographic location information is not within the predetermined geographic area, transmit a proximate geographic location information having an error message to facilitate indication that the geographic location of the origination of the request is outside the predetermined geographic location based, at least in part, on the transient transaction resource.

30. The apparatus of claim 26, wherein the plurality of instructions, which, if executed by the processor, operatively enable a computing device to, if it is determined that the received request is not within the predetermined time span, transmit a proximate geographic location information having an error message to facilitate indication that the transient transaction resource is unavailable based, at least in part, on the transient transaction resource.

* * * * *